United States Patent
Osada

(10) Patent No.: US 11,972,313 B2
(45) Date of Patent: Apr. 30, 2024

(54) INFORMATION PROCESSING APPARATUS, IMAGE FORMING APPARATUS, AND WORK ESTIMATING METHOD THAT ALLOWS OBJECTIVE DETERMINATION OF ESTIMATION OF WORK RELATED TO PRINTING

(71) Applicant: KYOCERA Document Solutions Inc., Osaka (JP)

(72) Inventor: Yoshihiro Osada, Torrance, CA (US)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/956,737

(22) Filed: Sep. 29, 2022

(65) Prior Publication Data
US 2024/0111979 A1    Apr. 4, 2024

(51) Int. Cl.
G06F 3/12        (2006.01)
G06K 15/00    (2006.01)
G06K 15/02    (2006.01)

(52) U.S. Cl.
CPC ....... G06K 15/1823 (2013.01); G06K 15/002 (2013.01)

(58) Field of Classification Search
CPC ............. G06K 15/1823; G06K 15/002; G06K 15/407; G06F 3/1203; G06F 3/1244; H04N 1/23
See application file for complete search history.

(56) References Cited

U.S. PATENT DOCUMENTS

| | | | | |
|---|---|---|---|---|
| 2003/0202204 | A1* | 10/2003 | Terrill | G06Q 10/087 399/24 |
| 2011/0292413 | A1* | 12/2011 | Crean | H04N 1/00015 358/1.9 |
| 2018/0032293 | A1 | 2/2018 | Sakurai et al. | |
| 2021/0365218 | A1* | 11/2021 | Sutherland | G06F 3/04842 |

FOREIGN PATENT DOCUMENTS

JP    2018-015964 A    2/2018

* cited by examiner

*Primary Examiner* — Iriana Cruz
(74) *Attorney, Agent, or Firm* — Hawaii Patent Services; Nathaniel K. Fedde; Kenton N. Fedde

(57) ABSTRACT

Provided is an information processing apparatus that enables an objective determination of an estimation of work related to printing. A data acquiring unit acquires a job for estimation. A unit estimating unit calculates an estimation of the work for each specific unit of the job acquired by the data acquiring unit. An entire estimating unit estimates and updates the estimation of the work for the entire job in real time based on the estimation of the work for the specific unit at the time calculated by the unit estimating unit. An estimation presenting unit presents the estimation of the work calculated by the entire estimating unit in real time.

21 Claims, 5 Drawing Sheets

INFORMATION PROCESSING APPARATUS, IMAGE FORMING APPARATUS, AND WORK ESTIMATING METHOD THAT ALLOWS OBJECTIVE DETERMINATION OF ESTIMATION OF WORK RELATED TO PRINTING

BACKGROUND

The present disclosure particularly relates to an information processing apparatus, an image forming apparatus, and a work estimating method for estimating work related to production printing.

In industrial printing called production printing, which uses a commercial (industrial) printing apparatus, the composing members of the final product are produced by dividing the work into a plurality of processes. For example, in the case of bookbinding, a cover, a body (color), a body (black and white), promotional item(s), a band, a shipping envelope, or the like, are processed as different jobs. Then, in the middle of the process, each job is combined and finished as a book as the final product.

In industrial printing, there is an image forming apparatus such as a digital printer and a multifunctional peripheral (MFP) that print printed matter.

When performing a large amount of printing with the image forming apparatus, for each job, a process of estimating how much consumables such as toner and ink, printing time, or the like, are consumed should be performed (hereinafter, referred to as "estimation of work related to printing"). However, since the amount of consumables to be consumed and the printing time, or the like, differ for each page during printing, in fact, the pages are required to be drawn (rasterized) to calculate the estimation.

As a typical technique, a method for estimating the amount of ink consumed when printing is performed by an inkjet printing apparatus with higher accuracy than before is disclosed. In this technique, after acquiring a print job, adjustment data is acquired based on job information included in the print job. After determining the estimated range, the adjustment data is used to correct the image data to be printed. Then, the amount of ink expected to be consumed by printing the image represented by the corrected image data is calculated. Further, when flushing is performed, the amount of ink expected to be consumed by flushing is calculated.

SUMMARY

An information processing apparatus according to the present disclosure is an information processing apparatus for estimating work related to printing, including: a data acquiring unit that acquires a job for estimation; a unit estimating unit that calculates an estimation of the work for each specific unit of the job acquired by the data acquiring unit; an entire estimating unit that estimates and updates the estimation of the work for the entire job in real time from the estimation of the work for the specific unit at the time calculated by the unit estimating unit; and an estimation presenting unit that presents the estimation of the work calculated by the entire estimating unit in real time.

An image forming apparatus according to the present disclosure is an image forming apparatus for estimating work related to printing, including: a data acquiring unit that acquires a job for estimation; a unit estimating unit that calculates an estimation of the work for each specific unit of the job acquired by the data acquiring unit; an entire estimating unit that estimates and updates the estimation of the work for the entire job in real time from the estimation of the work for the specific unit at the time calculated by the unit estimating unit; and an estimation presenting unit that presents the estimation of the work calculated by the entire estimating unit in real time.

An estimation method according to the present disclosure is a work estimating method executed by an information processing apparatus for estimating work related to printing, including the steps of: acquiring a job for estimation; calculating an estimation of the work for each specific unit of the job that is acquired; estimating and updating the estimation of the work for the entire job in real time from the estimation of the work for the specific unit at the time that is calculated; and presenting the estimation of the work that is calculated in real time.

DETAILED DESCRIPTION

Figure 1:
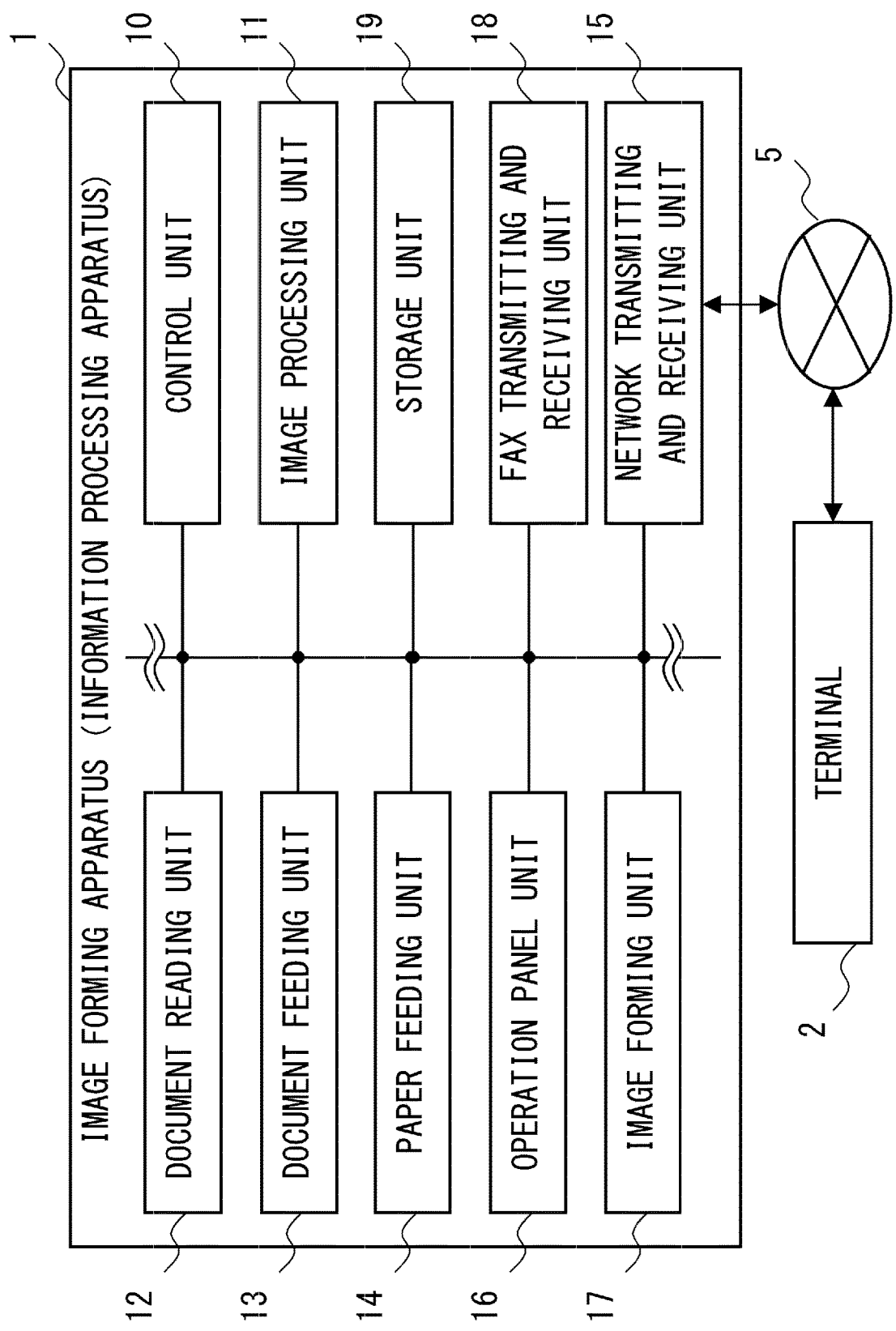
FIG. 1 is a system configuration diagram of an image forming apparatus according to an embodiment of the present disclosure.

<Embodiment>
[System Configuration of Image Forming Apparatus 1]
Firstly, with reference to FIG. 1, a system configuration of an image forming apparatus 1 is described.

The image forming apparatus 1 is an example of an information processing apparatus according to the present embodiment that estimates work related to printing according to instructions from a user such as a print shop clerk. In the example according to the present embodiment, the image forming apparatus 1 is an MFP that performs digital printing, and it estimates the consumption of consumables such as toner and ink as a estimation of the work.

Here, the image forming apparatus 1 is connected with a terminal 2 via a network 5.

Figure 2:
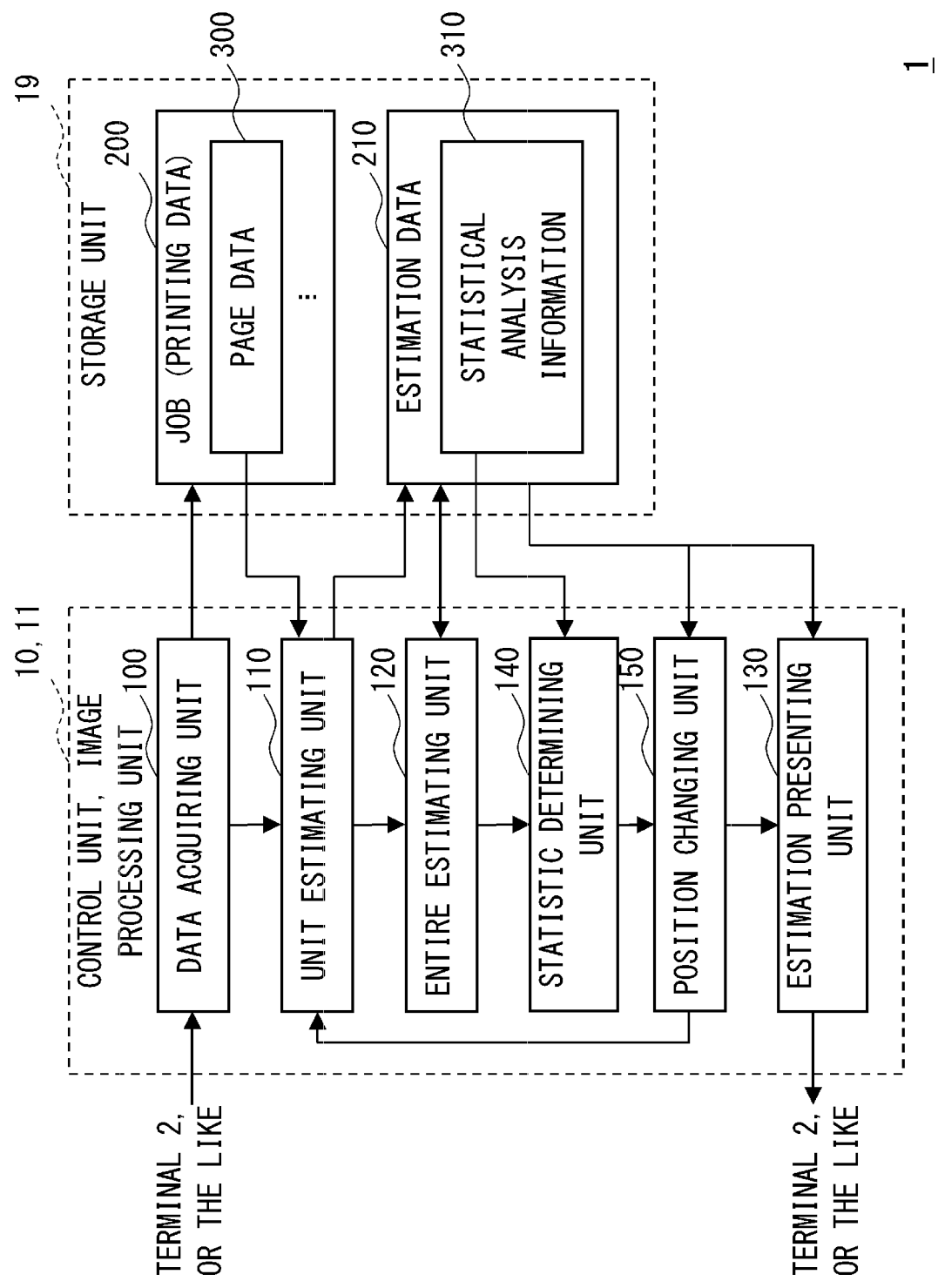
FIG. 2 is a functional configuration diagram of the image forming apparatus according to the embodiment of the present disclosure.

The terminal 2 is an example of an apparatus for the user to instruct the image forming apparatus 1 to estimate the work of the job 200 (FIG. 2). The terminal 2 is, for example, a PC (Personal Computer), a smart phone, a dedicated terminal, or the like.

The network 5 is, for example, a LAN, a wireless LAN, a WAN, a mobile phone network, a voice phone network, or the like.

In this embodiment, the image forming apparatus 1 includes a control unit 10, an image processing unit 11, a document reading unit 12, a document feeding unit 13, a paper feeding unit 14, a network transmitting and receiving unit 15, an operation panel unit 16, and an image forming unit 17, a FAX transmitting and receiving unit 18, a storage unit 19, and the like. Each unit is connected to the control unit 10 and controlled in operation by the control unit 10.

The control unit 10 is an information processing unit such as GPP (General Purpose Processor), CPU (Central Processing Unit), MPU (Micro Processing Unit), DSP (Digital Signal Processor), GPU (Graphics Processing Unit), ASIC (Application Specific Integrated Circuit, application-specific processor), or the like.

The control unit 10 reads the control program stored in the ROM or HDD of the storage unit 19, expands the control program in the RAM, and executes it, thereby operating as each unit of the function blocks as described later. In this embodiment, the control unit 10 performs to estimate the estimation of the work.

Also, the control unit 10 controls the entire apparatus according to instruction information input from the terminal 2 or the operation panel unit 16.

image processing unit 11 is control arithmetic unit such as a DSP (Digital Signal Processor) or a GPU (Graphics Processing Unit). The image processing unit 11 performs image processing on image data. This image processing may be, for example, processing such as enlargement/reduction, density adjustment, gradation adjustment, image improvement, and the like.

The image processing unit 11 can also store the image data read by the document reading unit 12 in the storage unit 19 as a job 200 (FIG. 2). At this time, the image processing unit 11 can convert the image data into an electronic document such as PDF or a file such as TIFF and store it in the job 200. Further, the image processing unit 11 may be capable of executing at least part of OCR (Optical Character Recognition) processing. In the present embodiment, the image processing unit 11 may also calculate at least part of the estimation of the work and the statistical analysis.

The document reading unit 12 is arranged on the upper part of the main body of the image forming apparatus 1 and reads a set document.

The document reading unit 12 includes a scanner, a platen glass, and a document reading slit. When reading a document placed on the platen glass, the document reading unit 12 moves the scanner to a position facing the platen glass, reads the document placed on the platen glass while scanning, acquires image data. The document reading unit 12 stores the acquired image data in the storage unit 19.

Further, when reading a document fed from the document feeding unit 13, the document reading unit 12 moves the scanner to a position facing the document reading slit. Then, the document reading unit 12 reads the document through the document reading slit in synchronization with the document feeding operation of the document feeding unit 13 to acquire image data. The document reading unit 12 stores the acquired image data in the storage unit 19.

The document feeding unit 13 conveys the document read by the document reading unit 12. The document feeding unit 13 is arranged above the document reading unit 12.

The document feeding unit 13 includes a document placing unit and a document conveying mechanism. The document feeding unit 13 feeds the documents placed on the document placing unit one by one by the document conveying mechanism and feeds them to the document reading unit 12.

The paper feeding unit 14 feeds recording papers one by one toward the image forming unit 17. The paper feeding unit 14 is provided within the main body.

The network transmitting and receiving unit 15 is a network connection unit including a LAN board, a wireless transmitting and receiving device, and the like for connecting to the terminal 2, an external server, and the like via the network 5.

The network transmitting and receiving unit 15 transmits/receives data through a data communication line, and it transmits/receives voice signals through a voice telephone line.

The operation panel unit 16 includes an input unit such as buttons, a touch panel, or the like, and a display unit such as an LCD (Liquid Crystal Display), an organic EL display, or the like. Further, the operation panel unit 16 is arranged on the front side of the image forming apparatus 1.

The buttons of the input unit of the operation panel unit 16 include a numeric pad, a start button, a cancel button, an operation mode switching button, buttons for giving instructions regarding the job 200, and the like. The operation modes may be copying, faxing, scanning, network scanning, and the like. Also, the instructions regarding the job 200 include instructions for printing, transmitting, saving, recording, or the like, for the selected document. Further, in the present embodiment, the instruction regarding the job 200 may include an instruction for performing the estimation of the work of the job 200. In addition, the information of each user can be inputted and changed according to the user's instruction acquired from the operation panel unit 16.

The image forming unit 17 forms an image on a recording paper by data stored in the storage unit 19, read by the document reading unit 12, or obtained from the terminal 2, according to a user's output instruction.

The image forming unit 17 is in the case of the dry electrophotographic type, it provides a photosensitive drum, an exposure unit, a developing unit, a transfer unit, a fixing unit, and the like. In this case, the image forming unit 17 records a toner image on a recording paper by executing an image forming process including charging, exposure, development, transfer, and fixing. Here, the image forming unit 17 can perform color printing by recording toner images of C (Cyan), M (Magenta), Y (Yellow), and K (Key plate, Black) toners.

Further, if the image forming unit 17 is in the case of the ink jet type, it is possible to record an ink image on recording paper by ejecting ink from the ink head. Also in this case, inks such as CMYK, or the like, may possibly be used.

In this embodiment, in addition, light color (neutral color) and special color toner (s) or ink (s) may be used as consumables, and the estimation of the work may be estimated as described later.

The FAX transmitting and receiving unit 18 performs facsimile transmitting and receiving. The FAX transmitting and receiving unit 18 can receive a facsimile from another FAX apparatus via a voice line, store the facsimile data in the storage unit 19, and cause the image forming unit 17 to form an image. Further, the FAX transmitting and receiving unit 18 can convert a document read by the document reading unit 12 or network FAX data transmitted from the terminal 2 into image data and facsimile transmit it to another FAX apparatus via a voice line.

The storage unit 19 is a non-transitory recording medium such as semiconductor memory as ROM (Read Only Memory) and RAM (Random Access Memory), or the like, or HDD (Hard Disk Drive), or the like.

The control program for controlling the operation of the image forming apparatus 1 is stored in the ROM or HDD of the storage unit 19. In addition, the storage unit 19 also stores user account settings. In addition, the storage unit 19 may include a storage folder area for each user.

In addition, the control unit 10 and the image processing unit 11 may be integrally formed as like a CPU having built-in GPU, a chip-on-module package, SOC (System On a Chip), or the like.

Also, the control unit 10 and the image processing unit 11 may incorporate RAM, ROM, flash memory, or the like.

[Functional Configuration of Image Forming Apparatus 1]

Here, with reference to FIG. 2, the functional configuration of the image forming apparatus 1 is described.

The control unit 10 of the image forming apparatus 1 includes a data acquiring unit 100, a unit estimating unit 110, an entire estimating unit 120, an estimation presenting unit 130, a statistic determining unit 140 and a position changing unit 150.

The storage unit 19 stores jobs 200 and estimation data 210.

The data acquiring unit 100 acquires a job 200 for estimation.

In this embodiment, the data acquiring unit 100 acquires the job 200 from, for example, the terminal 2, an external server on the network 5, or the like.

The unit estimating unit 110 calculates an estimation of the work for each specific unit of the job 200 (hereinafter simply referred to as "unit estimation") acquired by the data acquiring unit 100.

In this embodiment, the unit estimating unit 110 calculates the consumption estimation of consumables as the unit estimation for each page data 300.

The entire estimating unit 120 estimates and updates the estimation of the work for the entire job 200 (hereinafter simply referred to as the "entire estimation") in real time from the unit estimation at the time calculated by the unit estimating unit 110. In the present embodiment, the entire estimating unit 120 calculates an estimation of the consumption of consumables for the entire job 200 as the entire estimation.

In this case, the entire estimating unit 120 also calculates statistical analysis information 310 related to estimation of the estimation of the work including the entire estimation. For example, the entire estimating unit 120 can calculate the statistical analysis information 310 by using statistical estimation and testing, such as interval estimation of the population mean, or the like, other statistical models, various machine learning models, or the like (hereinafter simply referred to as "statistical model").

The estimation presenting unit 130 presents the entire estimation in real time. At this time, the estimation presenting unit 130 changes related display according to the update by the entire estimating unit 120. The related display includes a display of changes in the estimation of the work. In this embodiment, the change in this estimation of the work may indicate changing as like time-series in the entire estimation.

In addition, the estimation presenting unit 130 also presents the statistical analysis information 310 calculated by the entire estimating unit 120 in real time.

The statistic determining unit 140 compares the statistical analysis information 310 calculated by the entire estimating unit 120 with a target value. The target value and comparison are described later.

The position changing unit 150 changes the position where the unit estimating unit 110 calculates the unit estimation in the job 200 based on the entire estimation at the time calculated by the entire estimating unit 120. In this embodiment, this position is the position indicating the page data 300 for the unit estimation.

The job 200 is print data for estimating work related to printing. The job 200 is written in JDF (Job Description Format) and/or JMF (Job Messaging Format), and various files such as PS (Postscript), PDF (Portable Document Format), PDL (Page Description Language), PPML (Personalized Print Markup Language) of XML (Extensible Markup Language) format, or the like (hereinafter referred to as "PDF, or the like") may be included.

Here, in this embodiment, the job 200 includes a plurality of the page data 300.

The page data 300 is data including rasterization data for each page. In this embodiment, the amount of printing work, for example, the amount of consumption of consumables, or the like, differs for each page data 300 unit. The page data 300 may also be configured as PDF, or the like.

The estimation data 210 is data for the entire estimation. The estimation data 210 may include the unit estimation data and the entire estimation data.

Among these, the unit estimation data of the estimation data 210 may be stored as time-series data. The time (t) of this time-series data stores the value of each consumption amount of the unit estimation for the page position (m-th page) of the page data 300.

As for the data of the entire estimation in the estimation data 210, the estimated value at that time (current estimation value) is updated in real time. At this time, the estimation data 210 may also store time-series change data of the entire estimation in real time.

Furthermore, in this embodiment, the estimation data 210 includes statistical analysis information 310.

The statistical analysis information 310 is data including, for example, an upper limit value (limit +), a lower limit value (limit −), the target value (target), a reference value, and the like.

The upper limit value and the lower limit value are estimates of how much error occurs at the time by the statistical model with respect to the value of the entire estimation calculated and updated in real time. That is, the upper limit value and the lower limit value are, for example, values corresponding to what percentage of error can occur from the value of the entire estimation. These values may be, for example, upper and lower limits calculated with a 95% confidence interval, or the like.

The target value is the average value of the upper and lower limits. The target value deviates from 100% when the upper limit and lower limit are large, and it becomes 100% when the unit estimation for all the page data 300 of the job 200 is completed. That is, the target value is a value for presenting the deviation for the upper and lower limits of the error from the value of the entire estimation in an easy-to-understand manner to the user.

The reference value is, for example, a value that serves as a reference for estimation completion. In this case, the estimation may be completed when the difference between the upper limit value and the lower limit value becomes small to this degree, that is, when they converge. Specifically, the reference value may be a threshold for the value of (upper limit value−lower limit value) actually converted into cost. Alternatively, a specific amount such as $100 may be set as the reference value.

Farther, the reference value may be set as a sum when there is a plurality of consumables. Furthermore, as the reference value, values in multiple stages may be set. In addition, the setting of the reference value can be freely changed by the user, and it may be shared by the group or team to which the user belongs to.

Here, the control unit 10 of the image forming apparatus 1 executes the control program stored in the storage unit 19 to be functioning as the data acquiring unit 100, the unit estimating unit 110, the entire estimating unit 120, the estimation presenting unit 130, the statistic determining unit 140 and the position changing unit 150.

Further, each unit of the image forming apparatus 1 as described above serves as a hardware resource for executing the work estimating method of the present disclosure.

In addition, a part or any combination of the functional configurations described above may be configured in terms of hardware or circuits by using an IC, programmable logic, FPGA (Field-Programmable Gate Array), or the like.

[Work Estimation Process by Image Forming Apparatus 1]

Figure 3:
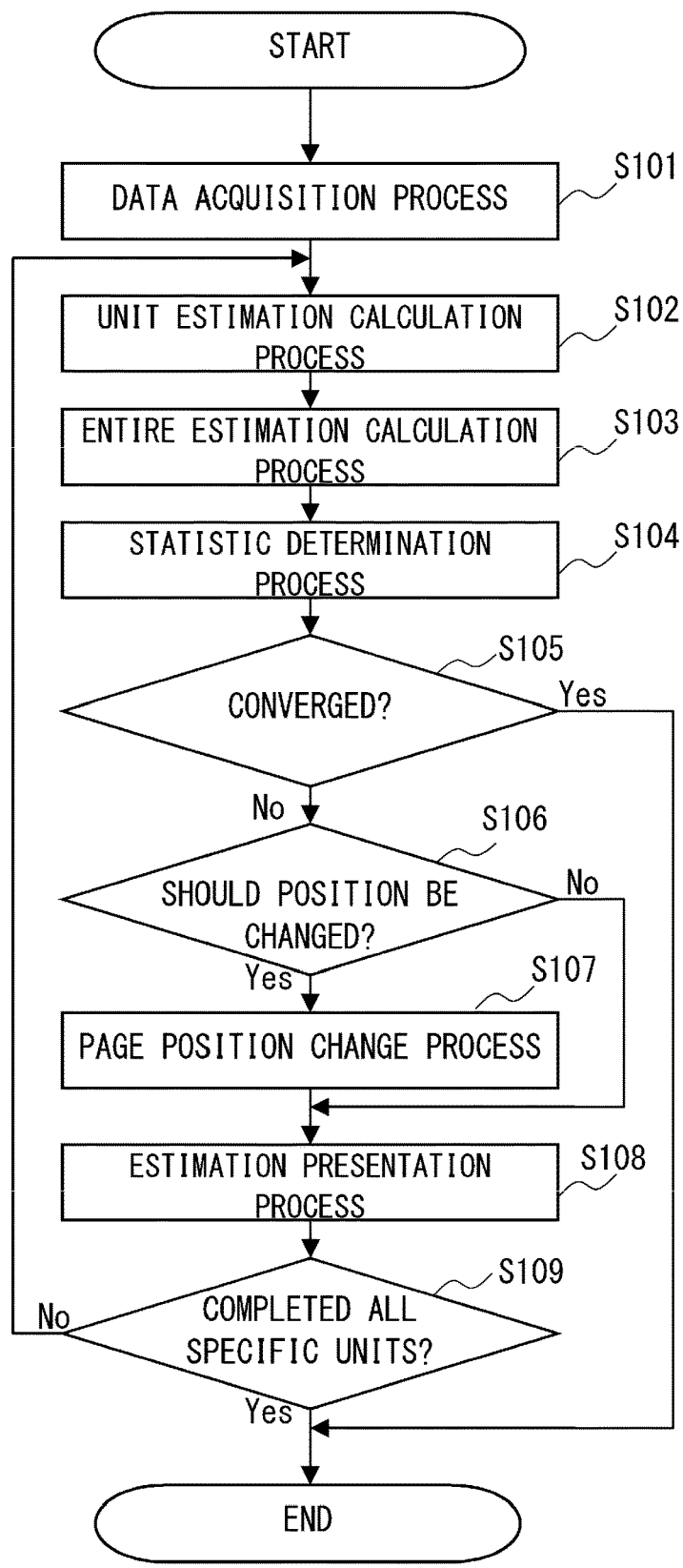
FIG. 3 is a flowchart of work estimation process according to the embodiment of the present disclosure.
Figure 4:
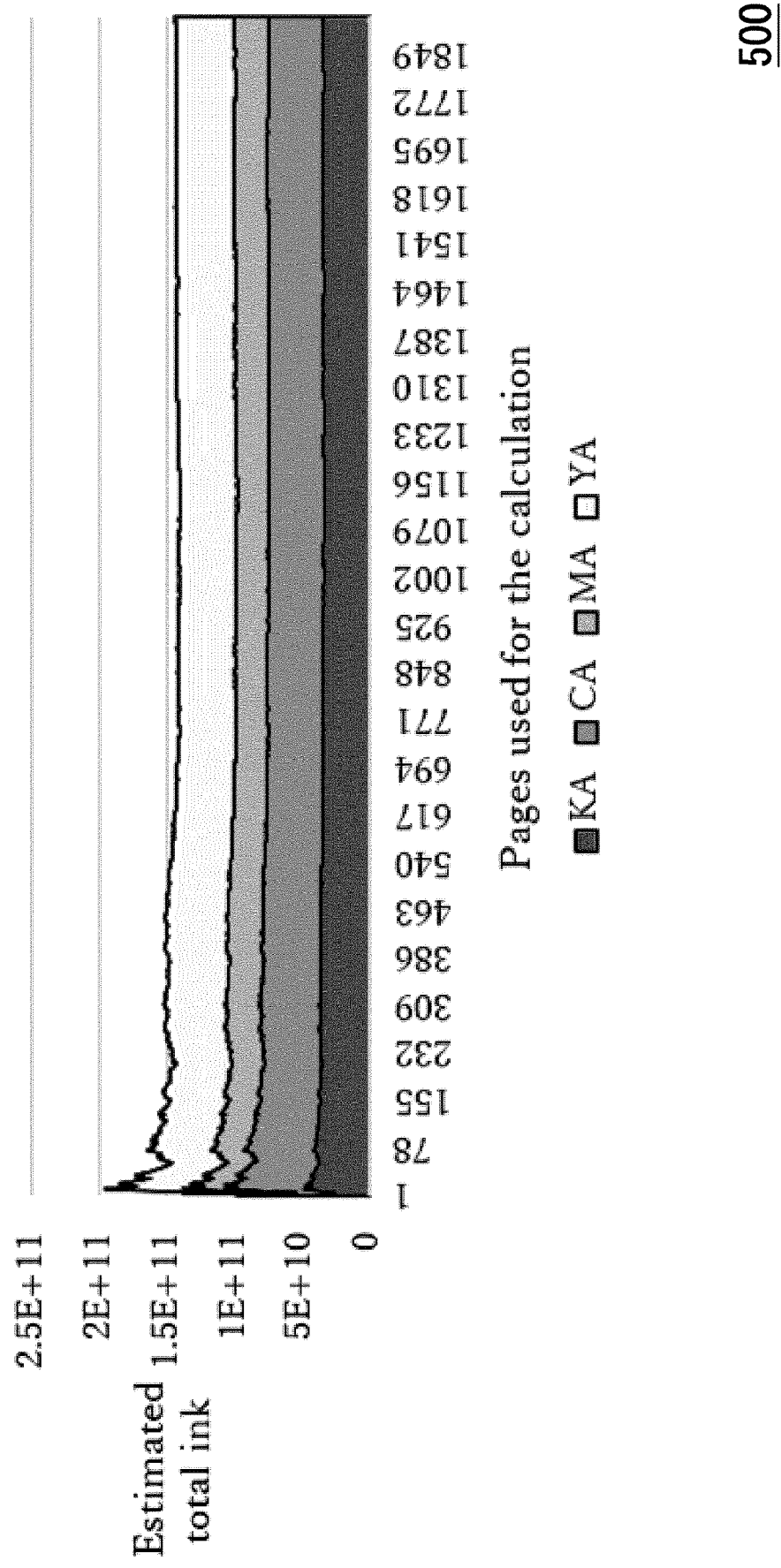
FIG. 4 is a screen example of the work estimation process as shown in FIG. 4.
Figure 5:
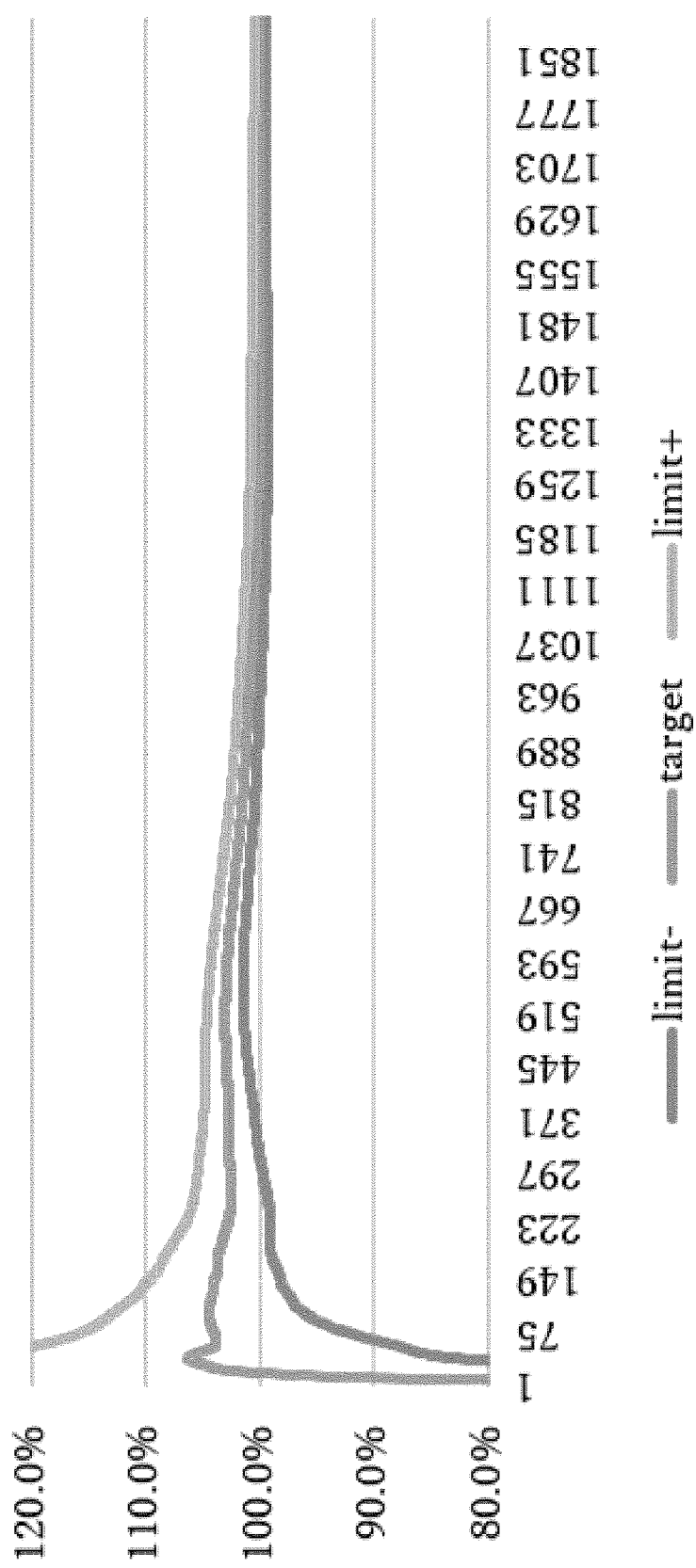
FIG. 5 is a screen example of the work estimation process as shown in FIG. 4.

Next, with reference to FIGS. 3 to 5, the work estimation process by the image forming apparatus 1 according to the embodiment of the present disclosure is described.

In the work estimation process according to the present embodiment, the job 200 for estimation is acquired mainly according to an instruction from the terminal 2. Then, the unit estimation of the acquired job 200 is calculated. Based on the unit estimation at the time of calculation, the entire estimation is estimated and updated in real time. Then, the calculated entire estimation is presented in real time.

In the work estimation process according to the present embodiment, the control unit 10 executes a program stored in the storage unit 19 in cooperation with each unit by using hardware resources.

In the follows, with reference to the flowchart of FIG. 3, the details of the work estimation process according to the present embodiment is described step by step.

(Step S101)

Firstly, the data acquiring unit 100 performs a data acquisition process.

The data acquiring unit 100 acquires the job 200 for work estimation from, for example, the terminal 2 or an external server on the network 5 and stores it in the storage unit 19.

Thereafter, in the present embodiment, the data acquiring unit 100 acquires an instruction for estimating the work from the web browser of the terminal 2 or dedicated application software (hereinafter referred to as "application").

Then, the data acquiring unit 100 starts performing the estimation of the work. In this embodiment, the consumption amount of toner consumables is estimated.

(Step S102)

Here, the unit estimating unit 110 performs a unit estimation calculation process.

The unit estimating unit 110 calculates a unit estimation by using a page data 300 of the job 200 stored in the storage unit 19 as a specific unit. That is, in the present embodiment, the unit estimating unit 110 calculates the consumption estimation of consumables for each page data 300 of the job 200.

Specifically, the unit estimating unit 110 calculates, for example, each consumption amount of consumables such as CMYK toners or inks, or the like, as the unit estimations.

Here, in the present embodiment, the consumption cannot be estimated, accurately, in the state of the page data 300 such as PDF, or the like. Therefore, the unit estimating unit 110 once performs RIP (Raster Image Processor) processing (hereinafter referred to as "rasterization") for the page data 300. At this time, the unit estimating unit 110 can count the number of pixels, or the like, included in the rasterized image data to calculate the consumption of each consumable used. Note that the image forming unit 17 does not output the rasterized image data when the estimation of the work is performed.

The unit estimating unit 110 stores the value of each consumption amount of the unit estimation for each page in the estimation data 210 as time-series data.

(Step S103)

Then, the entire estimating unit 120 performs entire estimation calculation process.

In this embodiment, the entire estimating unit 120 estimates and calculates the entire estimation.

Specifically, when the unit estimation only for the first N pages of the page data 300 of the job 200 has been performed, and when the page data 300 included in the job 200 is M pages in total, the entire estimating unit 120 estimates the entire estimation by the equation (1) as follows:

$$\text{Entire estimation} = M \times (\text{Unit estimation for } N \text{ pages}/N) \quad \text{equation(1)}$$

At this time, the entire estimating unit 120 also calculates the statistical analysis information 310 by using the statistical model, and it stores the statistical analysis information 310 as part of the estimation data 210.

As the statistical analysis information 310, the entire estimating unit 120 can calculate upper and lower limits, for example, by calculating the interval estimation by using equation (2) as follows:

$$\bar{x} - t_{(n-1,\alpha)} \sqrt{\frac{V}{n}} \le \mu \le \bar{x} + t_{(n-1,\alpha)} \sqrt{\frac{V}{n}} \quad \text{equation (2)}$$

where ρ (mu) is the population mean, x bar is the sample mean, α (alpha) is 1 minus the confidence, n is the sample size, V is the unbiased variance, t(n−1, P) is the degree of freedom n−1 The two-sided 100P % points of the t-distribution are as shown.

Here, the entire estimating unit 120 calculates the unbiased variance V(s$^2$) by the following equation (3).

[Number 2]

$$s^2 = \frac{1}{n-1} \sum_{i=1}^{n} (x_i - \bar{x})^2 \quad \text{equation (3)}$$

where n is the sample size and the x bar is the sample mean.

This interval estimation is an estimation for a normal distribution, such as a normal measured value. Here, the value of the unit estimation in each page data 300 of the job 200 according to this embodiment may vary greatly. For this reason, as shown in the position change processing to be described later, the entire estimating unit 120 can detect repetitive patterns and perform interval estimation for each repetitive pattern.

Also, the entire estimating unit 120 may use the other appropriate model for estimating the amount of change in the unit estimation, or the like.

Thereby, the entire estimating unit 120 calculates the average value of the upper limit value and the lower limit value as the target value.

(Step S104)

Then, the statistic determining unit 140 performs a statistic determination process.

The statistic determining unit 140 calculates a statistic determination value by, for example, equation (4) as follows:

$$\text{Statistic determination value} = (\text{upper limit value} - \text{lower limit value})/\text{value of entire estimation at the time} \quad \text{equation (4)}$$

(Step S105)

Then, the statistic determining unit 140 determines whether or not the determined values are converged. The statistic determining unit 140 determines Yes if the statistical determination value is equal to or less than the reference value (threshold value) set in the statistical analysis information 310. This is because the estimated error with respect to the target value is small, and it is considered that the convergence rate is sufficient. In this case, for example, the statistic determining unit 140 may possibly determine Yes under a condition such that the numerical value of (upper limit value−lower limit value) actually converted to cost is less than $100, and the value of (upper limit value−lower limit value)/the entire estimation is less than 10%. On the other hand, in other cases, the statistic determining unit 140 determines No because the error has not converged to a large extent.

In the case of Yes, the statistic determining unit 140 completes the entire estimation in the work estimation process. That is, the statistic determining unit 140 may interrupt in the middle without performing the unit estimation for the whole page data 300 of the job 200. In this embodiment, the estimation target can be changed during the estimation in this way.

In the case of No, the statistic determining unit 140 advances the process to step S106.

(Step S106)

If not converged, the position changing unit 150 determines whether or not the position should be changed. Specifically, in the present embodiment, the position changing unit 150 determines whether to change the position of the page data 300 for which unit estimation is to be performed based on the processing result of the entire estimation up to that point. For example, the position changing unit 150 refers to the time-series data of the unit estimation, and it detects a repetitive pattern by using autocorrelation, or the like. At this time, the position changing unit 150 determines Yes if the repetitive pattern is detected. Otherwise, the position changer 150 determines No.

In the case of Yes, the position changing unit 150 advances the process to step S107.

In the case of No, the position changing unit 150 advances the process to step S108.

(Step S107)

If the position should be changed, the position changing unit 150 performs page position change process.

Here, the position changing unit 150 dynamically determines the position of the page data 300 for unit estimation.

The position changing unit 150 dynamically determines the position where the next estimation of the work is performed for the unit estimation based on the processing results up to that point.

Specifically, for example, if a repetitive pattern is detected, the position changing unit 150 may move the position one to several times ahead in the cycle of the repetitive pattern, or the position of the last period calculated from the last page. This allows a quick confirmation that the repetitive pattern is to continue thereafter.

(Step S108)

Here, the estimation presenting unit 130 performs an estimation presenting process.

The estimation presenting unit 130 presents the estimation of the work calculated by the entire estimating unit 120 in real time.

In this embodiment, the estimation presenting unit 130 generates a related display in accordance with the update of the entire estimation in the estimation data 210. Specifically, the estimation presenting unit 130 may draw a time-series change in the entire estimation as a graphical image, or the like, as a display of the change in the estimation of the work. The entire estimation and the statistical analysis information 310 may be added to this graphical image, or the like.

After that, the estimation presenting unit 130 transmits data such as the drawn graphical image, or the like, to the terminal 2, or the like, and displays it on the screen of the web browser or dedicated application.

A screen example 500 in FIG. 4 is an example of a graphical image presenting time-series-like changes in the entire estimations (Estimated total ink consumption). In this example, the relationship between the calculated number of pages (pages used for the calculation) and the estimation result of consumables is drawn as changes in the estimated consumption of consumables (Estimated total ink) for each color of CA (C), MA (M), YA (Y), and KA (K). In this example, the job 200 includes 1908 pages of page data 300, and from the left, changes in how many pages of page data 300 are used for the estimation are as shown. In other words, the right end of this graph is equivalent to the estimation of the entire job 200. In this way, more accurate estimation results can be obtained by using a large amount of page data 300 for calculation. Conversely, if the amount of page data 300 used for estimation is small, correct results may not be obtained.

A screen example 501 in FIG. 5 is an example of a graph to which statistical analysis information 310 is added. Here, the upper limit value (limit +), the lower limit value (limit −), and the target value (target) calculated by the interval estimation are drawn. The user can confirm the upper limit value and the lower limit value together, he or she can use, for example, a safer upper limit value as the estimation result.

In this way, how the results of the entire estimation change over time can be displayed to the user, and either or both of the entire estimation, which has low accuracy but can be replied quickly, and the entire estimation, which has high accuracy after the passage of time, can be presented.

Further, in the above example, the estimation presenting unit 130 generates a related display as a time-series graphical image, or the like, but it may be presented as a text as follows. In this example, an entire estimation of $0.5 per mL is shown:

Completed Pages (%) 3%
Estimation Value of Entire estimation $15 (31 mL)
Elapsed Time: 10 seconds
Estimated Finish Time: 3 minutes (Step S109)

Then, the estimation presenting unit 130 determines whether the unit estimations have been completed for all specific units. The estimation presenting unit 130 determines Yes if the unit estimation is completed for all the page data 300. The estimation presenting unit 130 determines No in other cases.

In the case of Yes, the estimation presenting unit 130 completes the entire estimation in the work estimation process.

In the case of No, the estimation presenting unit 130 returns the process to step S102, continues calculation of the unit estimation in real time, and updates the estimation data 210.

With the above, the work estimation process according to the embodiment of the present disclosure completes.

As configured in this way, the following effects can be obtained.

As for the estimation of the consumption of consumables, since the consumption cannot be estimated in the state of PDF, or the like, rasterization is sometimes performed once.

In such case, when the entire job is rasterized for estimation, the accuracy is maximized, but the entire job is processed, so the estimation itself consumes time and computational resource costs.

On the other hand, if only the first few pages of job were rasterized and estimated, the results would be obtained immediately, but accuracy would likely be an issue. Therefore, it is difficult for the user to determine how many pages to estimate and therefore may make simple mistakes.

For this reason, there is a demand for a technology that enables objective determination of the estimation of the works without having to process all of the jobs.

On the other hand, the image forming apparatus 1 according to the embodiment of the present disclosure is an information processing apparatus for estimating work related to printing, including: a data acquiring unit 100 that acquires a job 200 for estimation; a unit estimating unit 110 that calculates an estimation of the work for each page data 300 of the job 200 acquired by the data acquiring unit 100; an entire estimating unit 120 that estimates and update the estimation of the work for the entire job 200 in real time from the estimation of the work for the page data 300 at the time calculated by the unit estimating unit 110; and an estimation presenting unit 130 that presents the estimation of the work calculated by the entire estimating unit 120 in real time.

With this configuration, an update-type information processing apparatus can be provided. That is, when a part of the work is processed and the entire estimation of the job 200 is estimated, the contents of the estimation of the work can be updated asynchronously and independently of the user's operation. In other words, when estimating the entire work by processing only a part of the work related to estimating the work, a dynamic estimation that changes with the passage of time can be performed. As a result, an estimation of the work that allows objective judgment can be presented. Further, quick or highly accurate information regarding estimation of the works can be provided. In addition, variations in entire estimations by users can be objectively suppressed.

Further, the image forming apparatus 1 according to the embodiment of the present disclosure is that the estimation presenting unit 130 changes related display according to the update by the entire estimating unit 120.

By configuring in this way, the related display is changed according to the update result, that is, the content of the graph, or the like, displayed on the terminal 2 is updated in real time. Therefore, if the user has time, he or she can obtain a more accurate estimation result of the entire estimation.

Therefore, after the job 200 is acquired, the consumables can be estimated while the user is giving an explanation. Then, the user can proceed effectively with negotiations while looking sideways at the value of the updated entire estimation and the cost estimated by the separately set calculation formula.

Specifically, the user can request a customer who has made a quick decision to conclude a contract with a relatively high entire estimation, which was estimated before convergence. On the other hand, the user can use the value of the entire estimation, which has become more accurate with the passage of time, for the customer who wants to negotiate. Therefore, even if price reduction requests are repeated, an effective response can be attained.

The image forming apparatus 1 according to the present embodiment is that the related display includes a display of changes in estimation of the work.

With such a configuration, time-series information is displayed, and this allows the user to browse the time-series change of the entire estimation as a graph, or the like. Therefore, the user can make objective judgments such as price determination for the estimation of the consumable supplies.

In the image forming apparatus 1 according to the present embodiment, the entire estimating unit 120 also calculates statistical analysis information 310 related to the estimation of the work, and the estimation presenting unit 130 also presents the statistical analysis information 310 calculated by the entire estimating unit 120 in real time.

By configuring in this way, the statistical analysis information 310 allows the user to guess whether or not the estimated value of the entire estimation is likely to converge from values that change from moment to moment. Therefore, he or she can make a prompt estimate during the negotiations. For example, the user can make an objective judgment by checking the upper limit value, the lower limit value, and the target value included in the statistical analysis information 310 by using a graph, or the like.

The image forming apparatus 1 according to the present embodiment further includes a statistical determination unit 140 that compares the statistical analysis information 310 calculated by the entire estimating unit 120 with a target value.

By configuring in this way, comparison with the target value can be automatically performed from the statistical analysis information 310. For this reason, the user's time and effort for judgment can be reduced. Also, the statistic determining unit 140 can make more objective judgments by using models, or the like.

The image forming apparatus 1 according to the present embodiment further includes a position changing unit 150 for changing a position at which the unit estimating unit 110 calculates the estimation of the work in the job 200 based on the estimation of the work at the time calculated by the entire estimating unit 120.

By configuring in this way, when a repetitive pattern is detected by referring to the time-series data of the unit estimation, the position where the unit estimation of the page data 300 can be changed, or the like, according to the cycle of this pattern. Therefore, the entire estimation can be estimated more quickly and reliably with less error.

[Other Embodiments]

In addition, in the above-described embodiment, an example is described that a digital printing MFP performs the estimation of the work.

However, the terminal 2 may be configured to estimate the work. In this case, a dedicated application for the terminal 2 may be used to estimate the work.

Alternatively, a configuration is also possible in which the work is estimated by a server connected via a network, an apparatus for preprinting that performs rasterization, or the like.

That is, the estimation of the work may be performed by using an apparatus other than the image forming apparatus 1 as the information processing apparatus. Further, in such case, in addition to the terminal 2 and the image forming apparatus 1, it is also possible to perform the estimation of the work as an information processing system including a server.

By configuring in this way, various configurations can be adapted.

Further, in the above-described embodiment, an example of estimating consumables such as toner or ink is described as the estimation of the work related to printing.

However, the estimation of the work may also be an estimation of the printing time. In addition, various printing estimation of the works can be made for execution of job 200 having many pages.

By configuring in this way, the objective judgments about various operations related to printing can be performed.

Further, although the type of the job 200 is not described in the above-described embodiment, it is possible to change the model, or the like, depending on the type of printed matter to be output.

For example, the model, or the like, may be changed between an advertisement, a catalog, an insurance pamphlet, and the like, which are repetitive and often color-printed, and ordinary book printing, which is not repetitive and less color-printed, usually. Further, as a method of changing the position of the page data 300, if the amount of ink in each copy is substantially the same as in the case of printing a number of copies, a repetitive pattern may be detected for each copy.

Furthermore, in the case of normal book printing, a process of not detecting repetitive patterns may be performed.

As a result, the change in the estimation can become easier to be converged, and an accurate estimation can be calculated, quickly.

Furthermore, by the job 200, when printing all pages, number of copies, or page unit by using a plurality of printers, the estimation for each printer can be performed.

Also, the unit price and consumption of consumables may be calculated differently depending on whether the job 200 is for digital printing or for offset printing.

Also, the estimated unit price and other costs may be changed depending on the type of job 200, the number of pages, the presence or absence of post-processing, and the like.

By configuring in this way, it is possible to perform the estimation that is more convenient for the user.

Further, the configuration and operation of the above-described embodiment are examples, and needless to say, they can be modified and executed as appropriate without departing from the aim of the present disclosure.

What is claimed is:

1. An information processing apparatus for estimating work related to a job comprising a plurality of page data for printing, comprising:
   a data acquiring unit configured to acquire, for estimation, the job comprising the plurality of page data;
   a unit estimating unit configured to calculate an estimation of the work for each specific unit, of a plurality of specific units, of the job acquired by the data acquiring unit, wherein each specific unit, of the plurality of specific units, is a respective page data of the plurality of page data comprised by the job;
   an entire estimating unit configured to estimate and update the estimation of the work for the entire job in real time by accumulating, with prior calculated estimations of specific units of the plurality of specific units, the estimation of the work for a specific unit, of the plurality of specific units, at the time the estimation of the work for the specific unit is calculated by the unit estimating unit; and
   an estimation presenting unit configured to present the estimation of the work calculated by the entire estimating unit in real time.

2. The information processing apparatus according to claim 1, wherein
   the estimation presenting unit changes related display according to the update by the entire estimating unit.

3. The information processing apparatus according to claim 2, wherein
   the related display includes a graphical image presenting changes in the estimation of the work.

4. The information processing apparatus according to claim 1, wherein
   the entire estimating unit also calculates statistical analysis information related to the estimation of the work,
   the estimation presenting unit also presents the statistical analysis information calculated by the entire estimating unit in real time.

5. The information processing apparatus according to claim 4, further comprising:
   a statistic determining unit that compares the statistical analysis information calculated by the entire estimating unit with a target value and determines whether an estimated error is small with respect to the target value or not and whether a convergence rate is sufficient or not.

6. The information processing apparatus according to claim 1, further comprising:
   a position changing unit configured to change a position of the page data at which the unit estimating unit calculates the estimation of the work in the job based on the estimation of the work at the time calculated by the entire estimating unit.

7. The information processing apparatus according to claim 1, wherein
   the entire estimating unit calculates upper and lower limits of the estimation of the work for the entire job by interval estimation.

8. The information processing apparatus according to claim 6, wherein
   the position changing unit changes the position of the page data when a repetitive pattern is detected by referring to time-series data of the estimation of the work in the specific unit.

9. The information processing apparatus according to claim 1, wherein:
   the unit estimating unit is configured to perform the estimation of the work for each of the specific units, of the plurality of specific units, at respective times in a serial manner; and
   the entire estimating unit repeatedly performs said update estimation of the work for the entire job in real time based on the calculated estimations of the work for the specific units, of the plurality of specific units, which have been performed prior to the time of the update estimation.

10. An image forming apparatus for estimating work related to a job that comprises a plurality of page data for printing, comprising:
    a data acquiring unit configured to acquire, for estimation, the job that comprises the plurality of page data;
    a unit estimating unit configured to calculate an estimation of the work for each specific unit of a plurality of specific units of the job acquired by the data acquiring unit, wherein each specific unit, of the plurality of specific units, is a respective page data of the plurality of page data comprised by the job;
    an entire estimating unit configured to estimate and update the estimation of the work for the entire job in real time by accumulating, with prior calculated estimations of specific units of the plurality of specific units, the estimation of the work for a specific unit, of the plurality of specific units, at the time the estimation of the work for the specific unit is calculated by the unit estimating unit; and
an estimation presenting unit configured to present the estimation of the work calculated by the entire estimating unit in real time.

11. The image forming apparatus according to claim 10, wherein the estimation presenting unit changes related display according to the update by the entire estimating unit.

12. The image forming apparatus according to claim 11, wherein the related display includes a graphical image presenting changes in the estimation of the work.

13. The image forming apparatus according to claim 10, wherein the entire estimating unit also calculates statistical analysis information related to the estimation of the work, the estimation presenting unit also presents the statistical analysis information calculated by the entire estimating unit in real time.

14. The image forming apparatus according to claim 13, further comprising:
a statistic determining unit that compares the statistical analysis information calculated by the entire estimating unit with a target value and determines whether an estimated error is small with respect to the target value or not and whether a convergence rate is sufficient or not.

15. The image forming apparatus according to claim 10, further comprising: a position changing unit configured to change a position of the page data at which the unit estimating unit calculates the estimation of the work in the job based on the estimation of the work at the time calculated by the entire estimating unit.

16. A work estimating method executed by an information processing apparatus for estimating work related to printing, comprising the steps of:
acquiring a job for estimation, wherein the job comprises a plurality of page data;
calculating an estimation of the work for each specific unit, of a plurality of specific units, of the job that is acquired, wherein each specific unit, of the plurality of specific units, is a respective page data of the plurality of page data comprised by the job;
estimating and updating the estimation of the work for the entire job in real time by accumulating, with prior calculated estimations of specific units of the plurality of specific units, the estimation of the work for a specific unit of the plurality of specific units, at the time the estimation of the work for the specific unit is calculated; and
presenting the estimation of the work that is calculated in real time.

17. The work estimating method according to claim 16, wherein the step of presenting comprises:
changing related display according to the update.

18. The work estimating method according to claim 17, wherein
the related display includes a graphical image presenting of changes in the estimation of the work.

19. The work estimating method according to claim 16, further comprising
calculating statistical analysis information related to the estimation of the work,
presenting the calculated statistical analysis information in real time.

20. The work estimating method according to claim 19, further comprising a step of:
comparing the calculated statistical analysis information with a target value.

21. The work estimating method according to claim 16, further comprising a step of:
changing a position of the page data at which calculating the estimation of the work in the job based on the estimation of the work at calculated time.

* * * * *